United States Patent [19]

Smith, Jr.

[11] Patent Number: 4,737,636

[45] Date of Patent: Apr. 12, 1988

[54] SIMULTANEOUS NEUTRON LIFETIME AND OXYGEN ACTIVATION AND FLUID SAMPLING METHODS AND APPARATUS TO LOCATE FLUID FLOW IN A CASED WELL BOREHOLE

[75] Inventor: Harry D. Smith, Jr., Houston, Tex.

[73] Assignee: Halliburton Company, Duncan, Okla.

[21] Appl. No.: 931,490

[22] Filed: Nov. 17, 1986

[51] Int. Cl.⁴ .............................................. G01V 5/00
[52] U.S. Cl. ..................................... 250/269; 250/270
[58] Field of Search ............... 250/255, 265, 266, 269, 250/270; 376/160, 166

[56] References Cited

U.S. PATENT DOCUMENTS

| | | | |
|---|---|---|---|
| 3,688,115 | 8/1972 | Antkiw | 250/269 |
| 4,032,778 | 6/1977 | Paap et al. | 250/270 |
| 4,035,640 | 7/1977 | Arnold et al. | 250/270 |
| 4,057,720 | 11/1977 | Paap et al. | 250/270 |
| 4,233,508 | 11/1980 | Arnold | 250/266 |
| 4,350,888 | 9/1982 | Peelman | 250/270 |
| 4,388,529 | 6/1983 | Peelman | 250/270 |
| 4,409,481 | 10/1983 | Smith, Jr. et al. | 250/270 |
| 4,558,220 | 12/1985 | Evans | 250/269 |
| 4,574,193 | 3/1986 | Arnold et al. | 250/270 |

Primary Examiner—Janice A. Howell
Assistant Examiner—William F. Rauchholz
Attorney, Agent, or Firm—William J. Beard

[57] ABSTRACT

Methods are disclosed herein for determining the point of entry of water cut into a cased well borehole. A well logging sonde is moved past a perforated interval in a cased well borehole. The borehole environment is irradiated with 14 MeV neutrons from a neutron source and measurement of movement of oxygen activated borehole fluid past two gamma ray detectors spaced from the neutron source is combined with the speed of movement of the logging sonde to derive a signal representative of the entry location and flow rate of the oxygen activated fluid. At least one borehole fluid sample is taken in the interval between the point of neutron irradiation and the detection of oxygen activation gamma rays to resolve any ambiguity in the total flow rate of borehole fluid in the interval.

10 Claims, 5 Drawing Sheets

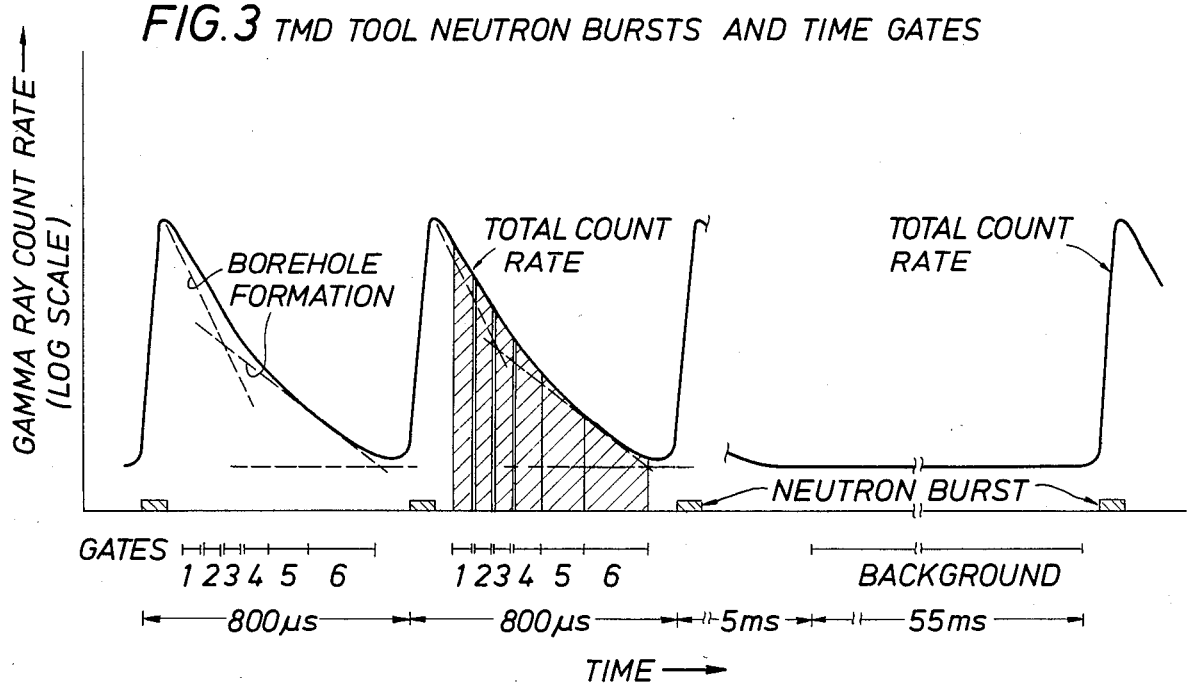
FIG.3 TMD TOOL NEUTRON BURSTS AND TIME GATES
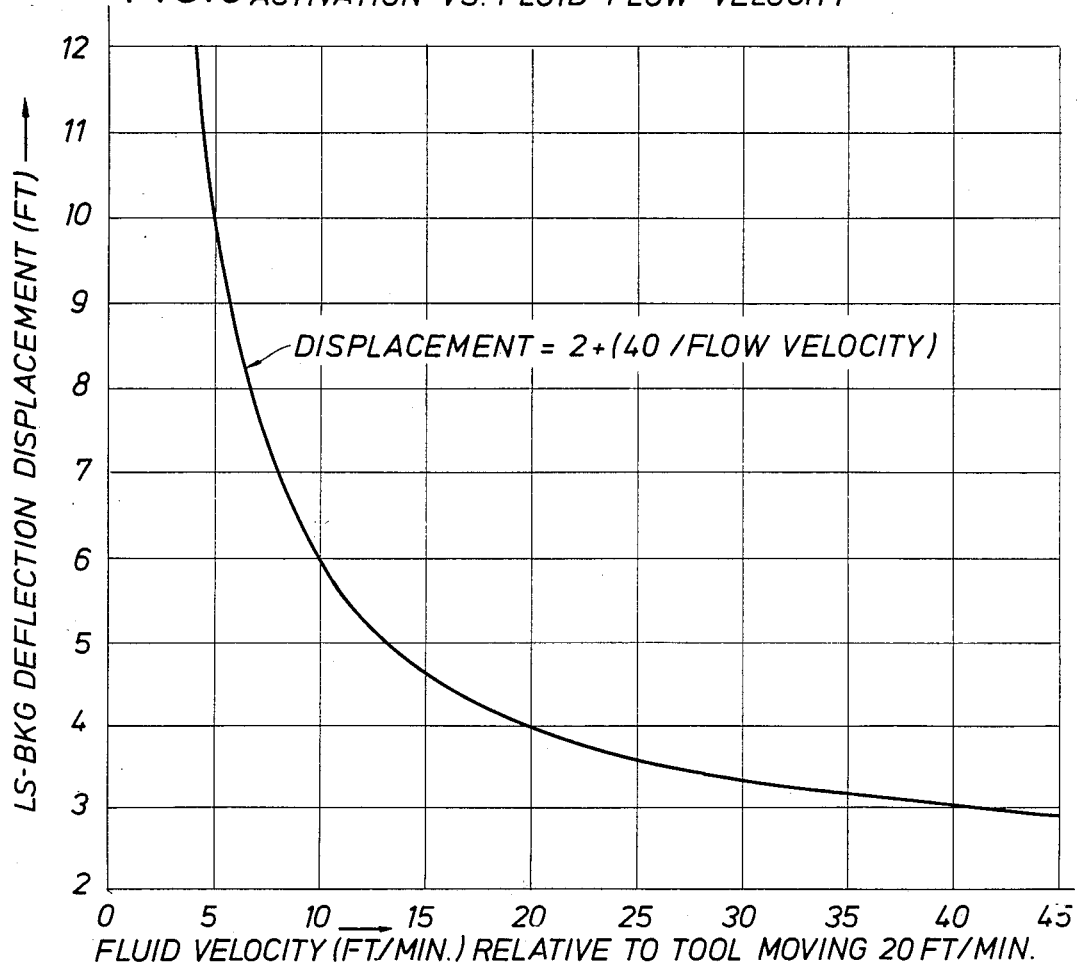
FIG.6 TMD LS-DETECTOR DISPLACEMENT FROM POINT OF WATER ACTIVATION VS. FLUID FLOW VELOCITY

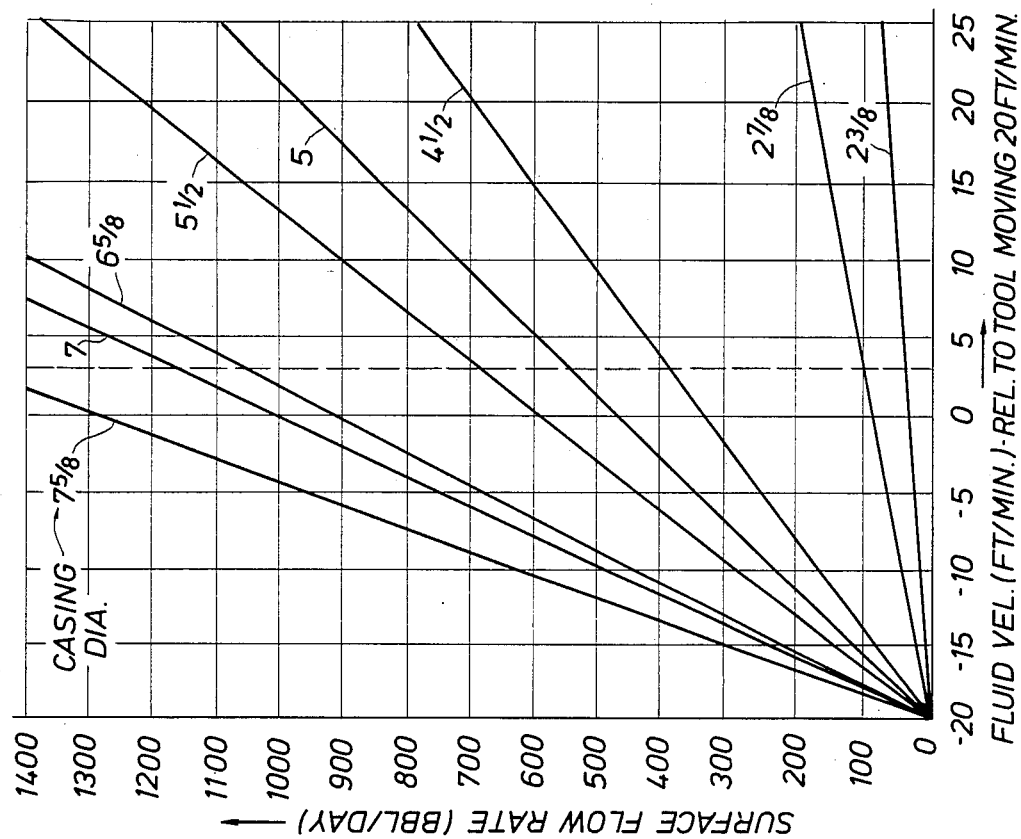
FIG.5 SURFACE FLOW RATE VS. BOREHOLE FLUID VELOCITY (RELATIVE TO TOOL) FOR VARIOUS CASINGS
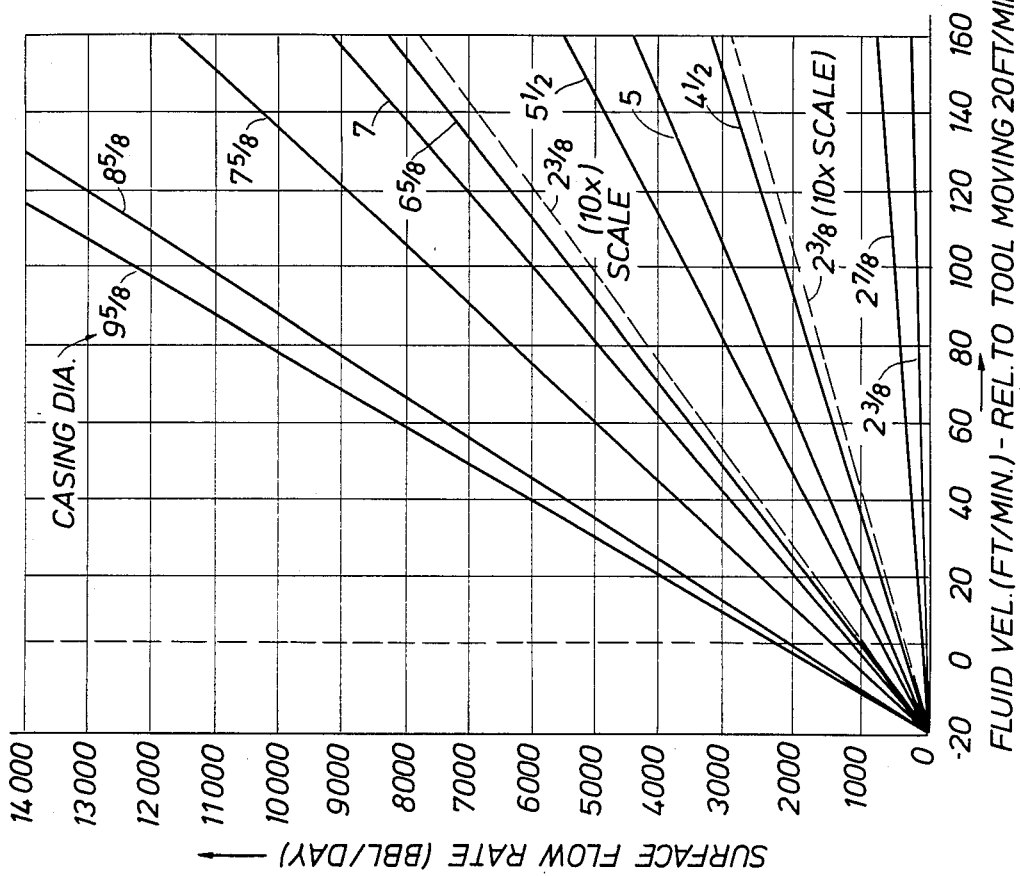
FIG.4 SURFACE FLOW RATE VS. BOREHOLE FLUID VELOCITY (RELATIVE TO TOOL) FOR VARIOUS CASINGS

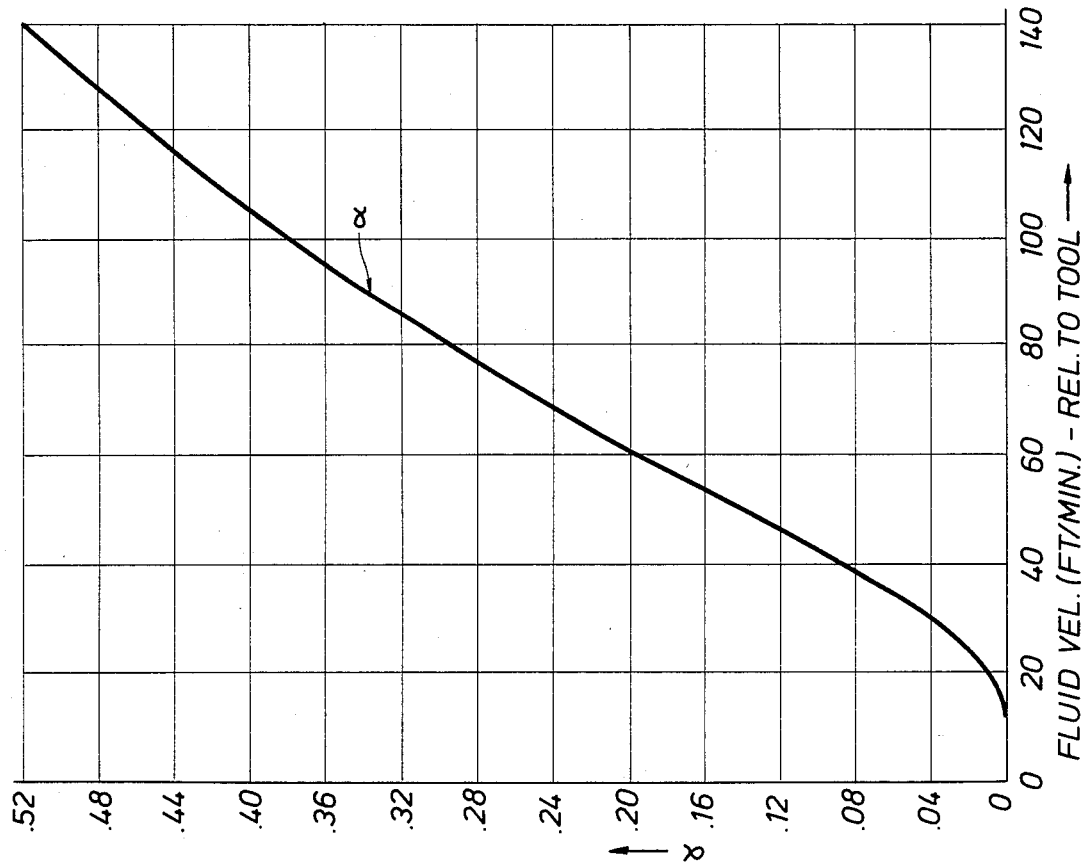
FIG.8 GAMMA ACTIVITY (≈API) FROM OXYGEN ACTIVATION IN LS DET. (TMD)
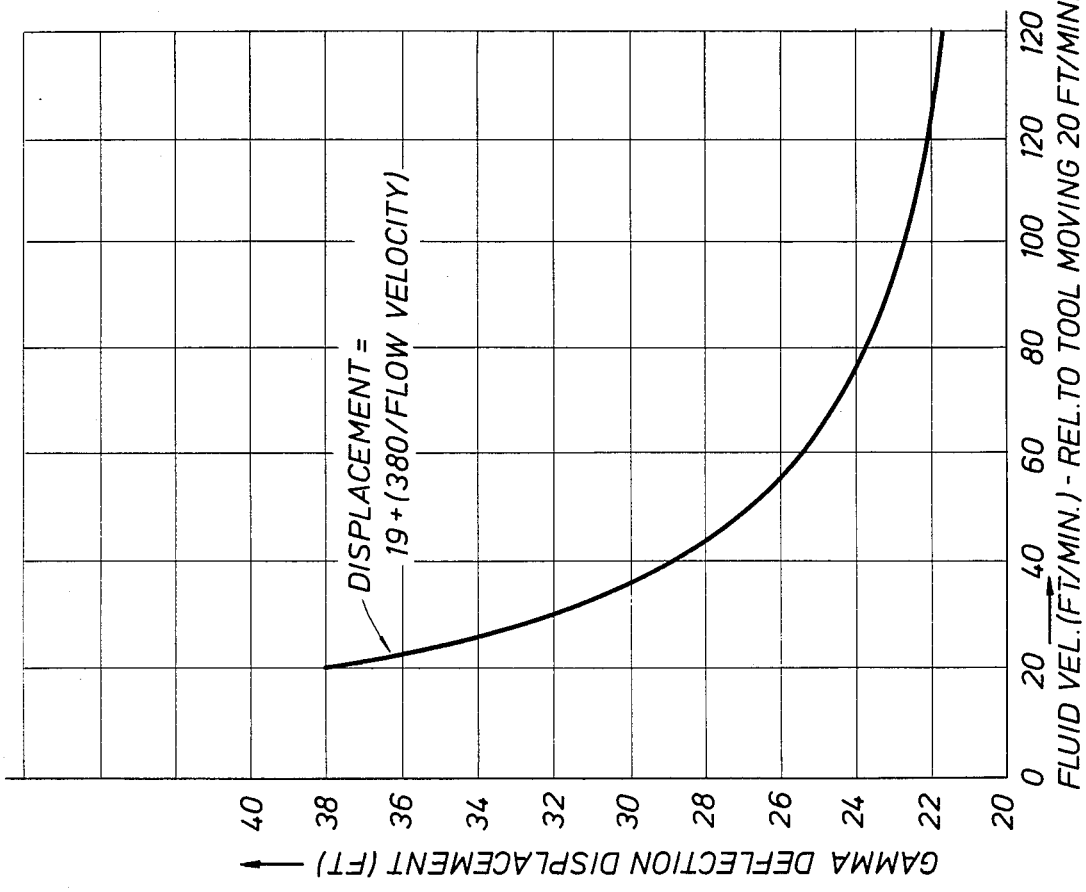
FIG.7 TMD GAMMA LOG DISPLACEMENT FROM POINT OF WATER ACTIVATION VS. FLUID FLOW VELOCITY

SIMULTANEOUS NEUTRON LIFETIME AND OXYGEN ACTIVATION AND FLUID SAMPLING METHODS AND APPARATUS TO LOCATE FLUID FLOW IN A CASED WELL BOREHOLE

BACKGROUND OF THE INVENTION

This invention relates to in situ measurements in a cased well borehole which can determine at least qualitatively the entry of fluid into the cased borehole and trace its movement through the cased borehole.

More particularly, the invention relates to a pulsed neutron well logging technique in which simultaneous determinations are made of the thermal neutron lifetime or thermal neutron decay time in a cased borehole and the movement of borehole fluid is traced through oxygen activation measurements and fluid sample measurements also made simultaneously in the well borehole.

Recent innovations in the art of pulsed neutron well logging by the assignees of the present invention have included the introduction of simultaneous measurements of earth formation and borehole thermal neutron decay time or thermal neutron life times in a dual detector small diameter (1-11/16 inch) instrument which is sized and adapted to be passed through production tubing into a cased well borehole. The thermal neutron capture cross sections of the borehole and earth formation surrounding the borehole are determined. The instrumentation can provide a variety of other information. For example, the radiation of the borehole and its environs with 10 MEV pulsed neutrons can result in the transmutation of oxygen 16 into nitrogen 16 plus a proton. This isotope of nitrogen is unstable and beta decays back into oxygen with a 7.35 second half life. The excited state of oxygen 16 thus produced immediately emits a 6.13 MEV gamma ray which can be detected by the gamma ray detectors on the dual detector pulsed neutron logging instrument as well as by any additional gamma ray detectors carried along the tool string with the dual detector instrument.

The operation and configuration of the dual detector pulsed neutron logging instrument referred to in the foregoing description are detailed with particularity in U.S. Pat. Nos. 4,350,888, 4,409,481, and 4,388,529 which are assigned to the Assignee of this application and are incorporated herein by reference. Details of the operation of this well logging system, hereafter referred to as the TMD system (Thermal Multigate Decay) will not be gone into in detail in the instant application. However, the portion of the operation of the instrument which is particularly germane to the instant disclosure will be discussed in more detail subsequently.

If the relative movement of the dual detector pulsed neutron logging instrument such as that used in the TMD system previously mentioned (and hereinafter referred to as the TMD well logging instrument) and the activated oxygen in well fluid moving through a well borehole meets the criteria laid out in more detail subsequently herein, it may be possible for the dual detector instrument to detect the flow of well fluid within the cased well borehole. The fluid moves past the detectors of the dual detector instrument and also past any additional gamma ray detectors which might be included in the tool string. Such oxygen activation techniques can be used for determining fluid salinity and are disclosed in U.S. Pat. No. 4,574,193 which is assigned to the current assignee and incorporated herein by reference.

Observations made in the time gates used for detecting background radiation in the pulsed neutron TMD well logging instrument can be used to detect oxygen activation in fluid in a well borehole which moves with respect the well logging instrument in a particular direction. Moreover, by moving the TMD well logging instrument through the well borehole at different speeds, the flow rate of the fluid may be determined if it lies within particular ranges at which the instrumentation would have optimum sensitivity. Because of the difference in the carbon to oxygen ratio of hydrocarbons and water, it may be possible to determine, qualitatively at least, whether the fluid moving past the detectors comprises a substantial water cut.

In the regard of determining whether the fluid moving past the detectors and oxygen activated comprises a fluid having a particular water cut, a fluid sampler is provided in the tool string in the present invention with the TMD well logging instrument along with a third gamma ray detector and casing collar locator. The fluid sampler may be used for capturing or taking fluid samples of the fluid at a particular location in a well bore in order to resolve ambiguous situations which can arise through the use of the TMD well logging instrument as an oxygen activation well logging instrument.

Other and further features and advantages of the techniques and apparatus of the present invention will become apparent in connection with the following detailed description of the invention. The description of the invention should be taken in conjunction with the accompanying drawings in order to properly understand the inventive concepts herein.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

FIG. 3 is a timing diagram illustrating the timing sequence used in the TMD well logging instrument for determining both the borehole and formation components of thermal neutron capture cross section and for determining the background radiation including activated oxygen present therein;

FIG. 4 is a graphical representation showing surface flow rate versus borehole fluid velocity relative to a well logging instrument for various casing sizes;

FIG. 5 is a graphical representation illustrating surface flow rate versus borehole fluid velocity relative to a well logging instrument for various casing sizes;

FIG. 6 is a graphical representation illustrating the LS-Detector Background log displacement associated with the TMD well logging instrument from a point of water oxygen activation versus fluid flow velocity in a well borehole;

FIG. 7 is a graphical representation illustrating the gamma ray log displacement associated with the TMD well logging instrument from a point of water oxygen activation versus fluid flow velocity in a well borehole; and FIG. 8 is a graphical representation of a parameter $\alpha$ used to convert LS-Background activity caused by oxygen activation into API gamma units which would be observed in the gamma ray detector.

DESCRIPTION OF THE PREFERRED EMBODIMENTS

Figure 1:
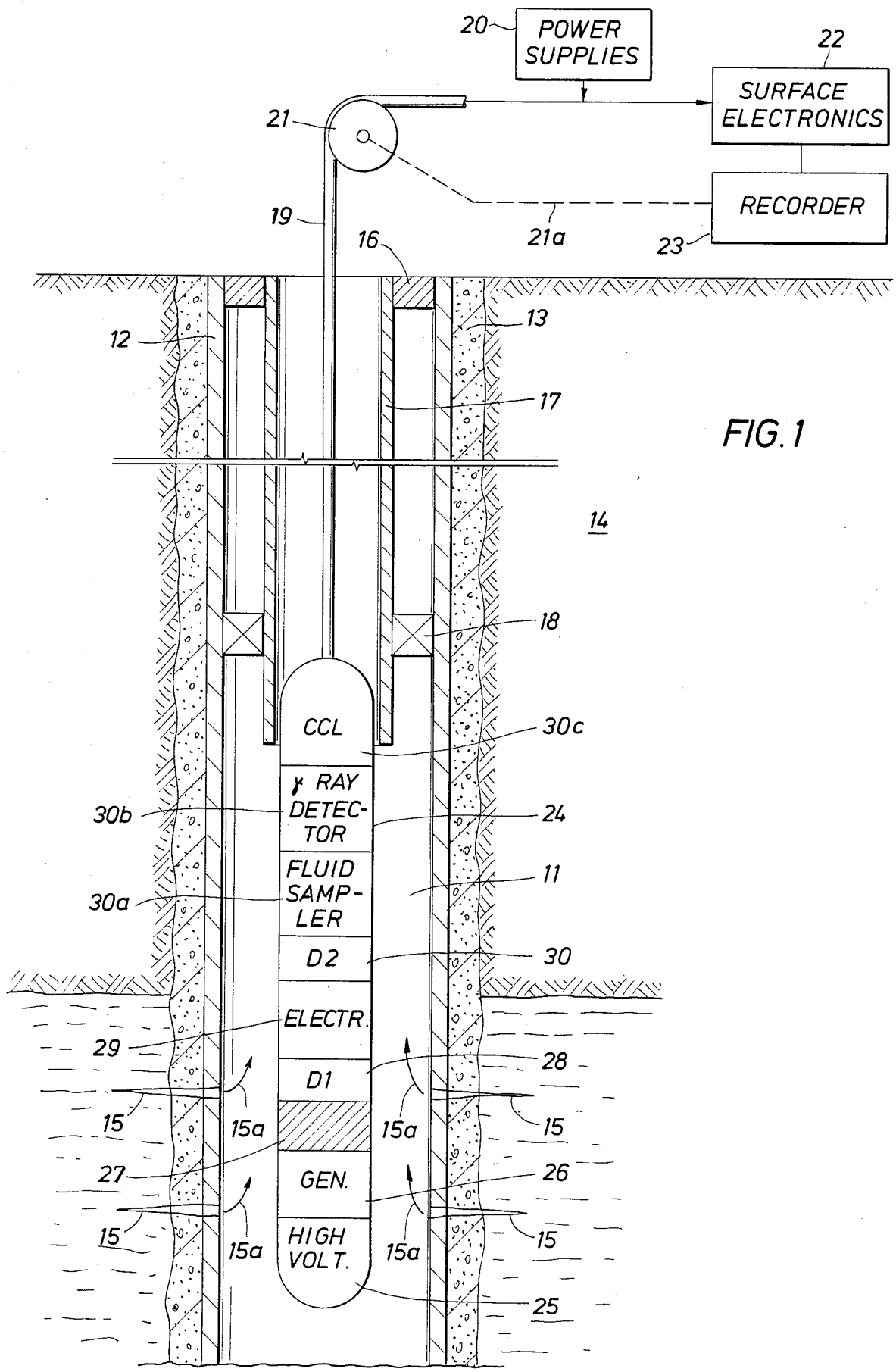
FIG. 1 is a highly schematic view showing a tool string comprising a TMD well logging instrument, a gamma ray detector, a fluid sampler and a casing collar locator in a tool string sized and adapted for running through tubing in a cased well borehole.

Referring initially to FIG. 1, the well logging apparatus according to the principles of the present invention is illustrated schematically. A well borehole depicted generally at 11 and filled with a well fluid penetrates earth formations 14. The borehole is lined with a steel casing 12 cemented in place by cement sheath 13. The earth formations 14 are connected to the well borehole through perforations 15 and fluid flow from the perforations is depicted by arrows 15a entering the well bore 11.

The well bore 11 of FIG. 1 is depicted in a producing condition with the well logging sonde indicated generally at 24 lowered into the producing zone below a packer 18 which is set in place to isolate the producing zones from the remainder of the well bore. The production is through a tubing string 17 and a surface closure 16 to tanks located at the surface (not shown). The generally small diameter well logging sonde indicated at 24 is sized with a 1 and 11/16 inch outside diameter so that it can easily traverse commonly used production tubing 17.

An armored well logging cable 19 suspends the sonde 24 into the producing formation via the tubing string 17 and further serves to communicate electrical signals to and from the down hole instrument via cable conductors of the armored cable 19. The cable 19 passes over a sheave wheel 21 located at the surface which is electrically or mechanically linked as indicated by dotted line 21a to well logging recording equipment 23 which receives a signal indicative of the borehole depth of the well logging sonde 24 from the sheave wheel 21 as it rotates when cable 19 passes thereover. Thus the recording apparatus 23 is enabled to record down hole measurements as a function of borehole depth as indicated by these depth signals. Power supplies 20 located at the surface supply, via cable 19 conductors, electrical power for the operation of the down hole equipment. Surface electronic equipment indicated generally at 22 of FIG. 1 serves to transmit control signals down to the downhole sonde 24 and receives measurement signals from the sonde 24 for processing therein.

For example, the surface electronic equipment indicated generally at 22 may comprise a general purpose digital computer which is programmed to determine the thermal neutron decay time of the borehole component and earth formation components of thermal neutron decay in and about the well borehole as discussed in the aforementioned patents. Similarly, such a computer could be programmed according to concepts which will be described more fully below in accordance with the principles of the present invention in order to qualitatively and, somewhat quantitatively, detect fluid flow in the producing formations 15 and entering the well bore through perforations 15a. In this regard such surface computer programming might follow the forms indicated in the aforementioned U.S. patents which describe the Thermal Multigate Decay processing of the TMD well logging instrument.

Referring in more detail, but still schematically to the down hole sonde 24, it will be observed that starting from its lower end, the sonde is equipped with a high voltage power supply indicated at 25. The high voltage power supply 25 supplies approximately 100 kilovolts at low current to a neutron generator tube indicated at 26. The neutron generator 26 is controlled by control electronics located in section 29 of the down hole sonde and via the surface electronic equipment indicated generally at 22.

A short spaced detector labeled D1 is located at 28 which is separated from the neutron generator 26 by a short section of shielding material labeled 27 in FIG. 1. Similarly, a second or long spaced detector labeled D2 at 30 in FIG. 1 also detects gamma rays resulting from neutron capture events and from naturally occurring radioactive processes in the borehole vicinity.

A fluid sampler 30a is located above the detector D2 at 30 in the downhole sonde 24. This fluid sampler contains a one-way electrically operated valve and may contain as many as two or three separate sample chambers which may be switchably connected to this valve. Signals from the surface electronics 22 can cause the fluid sampler valve to be opened to the borehole fluid at various points along the well borehole in order to capture a sample of borehole fluid at a particular depth for return to the surface. As will be indicated further below, this can help resolve ambiguities which might arise in the interpretation of fluid flow measurements in the borehole.

A gamma ray detector is located at 30b above the fluid sampler 30a in the down hole sonde 24. This gamma ray detector is on continuously and provides a generally continuous monitoring of gamma ray activity in the well borehole and its vicinity.

Finally, at the upper end of the sonde, a casing collar locator 30c is included. The casing collar locator is an electrical measuring device which can indicate the location of casing collars on the casing or tubing joints in the tubing string 17. The location of such features is helpful in pinpointing the depth in the wellbore of a particular feature of interest from the measurement signals.

Turning now to FIG. 3, the timing of the neutron pulses and detector gates used in the TMD logging process are illustrated schematically. A measurement cycle comprising approximately 1,250 neutron bursts and a 60 millisecond background counting interval occurs approximately each 1.06 seconds in the TMD system. The neutron bursts are indicated as small bumps on the abscissa axis occurring at 800 microsecond intervals. After each neutron pulse, a series of six time gates is used to gate each of the two gamma ray detectors located in the vicinity of the neutron generator on. Thus, the short spaced detector and the long spaced gamma ray detector will produce six count rate signals each, one representative of the count rate in each of the six gates following each neutron burst. The composite decay curve, which is indicated as total count rate, is basically comprised of three separate components. These are, a formation component due to capture gamma rays occurring from the nuclei of elements comprising the earth formations, a borehole component arising from capture gamma rays caused by the nuclei of elements in the well borehole, the casing and cement sheath capturing neutrons and emitting gamma rays as a result thereof and, finally, a background component which is illustrated in FIG. 3 as a fairly constant component by a lower dotted line running parallel to the abscissa axis.

The count rate data in each of the two detectors from the six time gates following each neutron burst are corrected for background as determined during the 55 millisecond background counting period at the end of each 1,250 bursts of neutrons and following a five millisecond delay, in order to allow most neutron capture events in the well bore to decay away to nothing. Thus, the background component is measured during a period of time when only naturally occurring background gamma radiation or perhaps oxygen activation gamma rays, as will be described in more detail below, occur.

Figure 2:
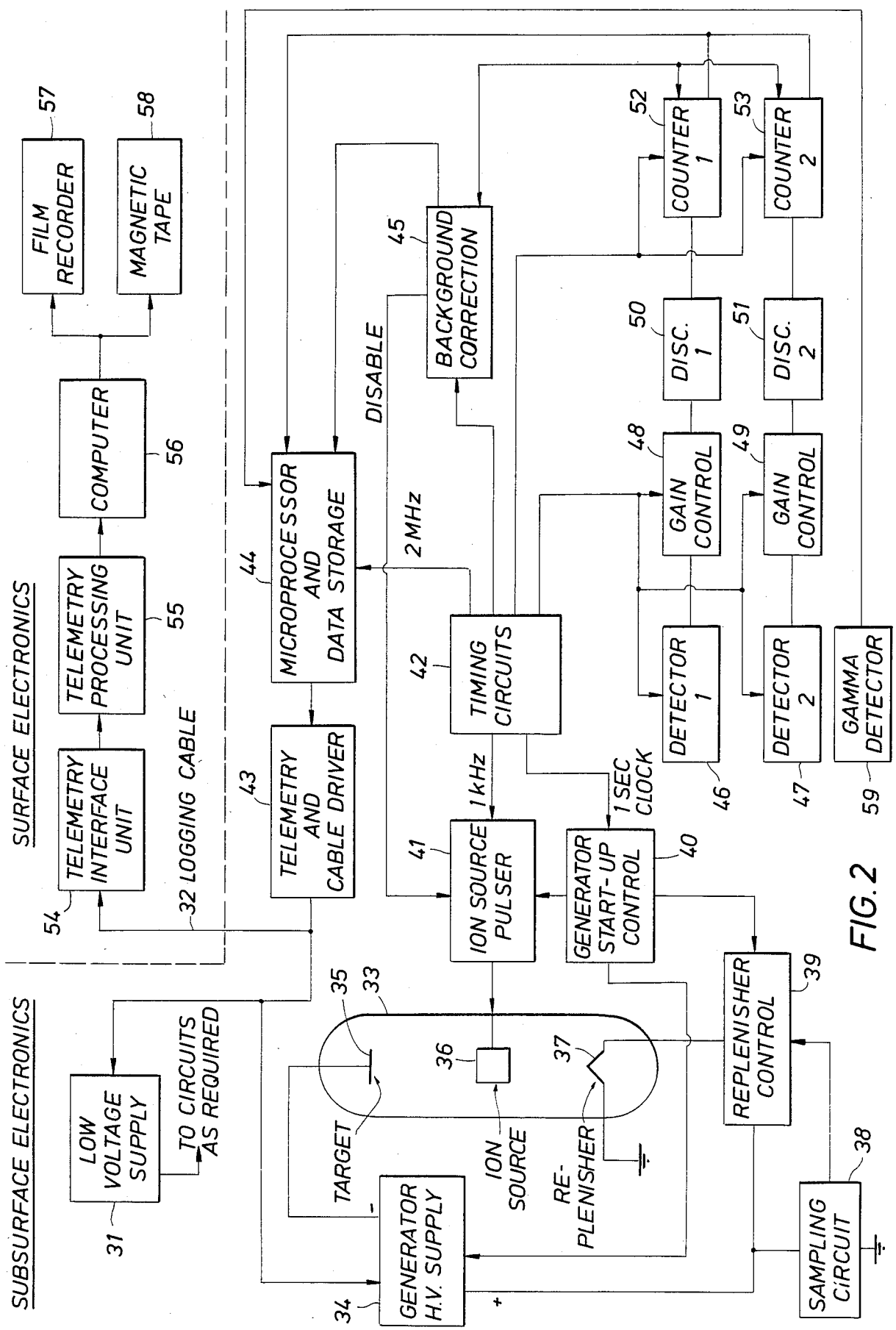
FIG. 2 is an electronic block diagram illustrating the operation of the tool string of FIG. 1 including the TMD well logging instrument in accordance with the concepts of the present invention.

Referring now to FIG. 2, a schematic block diagram illustrating the electronic portions of the subsurface and and surface electronic systems are illustrated in more detail, but still schematically. Power for operation of the subsurface electronics is supplied via a conductor of the well logging cable 19, to a conventional low voltage power supply 31, and a high voltage power supply 34. The high voltage power supply 34 may be of the Cockcroft-Walton multiple stage type and supplies approximately 100 kilovolts for the operation of the neutron generator tube 33 of FIG. 2. The generator tube 33 is of the deuterium-tritium accelerator type. An ion source 36 which is maintained at a potential near ground is used to generate deuterium and tritium ions from a deuterium and tritium gas mixture filling the envelope of tube 33. A replenisher heater 37 is impregnated with additional deuterium and tritium and maintains a gas pressure level of deuterium-tritium gas inside the tube 33 envelope sufficient to supply the ion source 36 with deuterium and tritium gas for ionization. A target 35 is impregnated with tritium and is maintained at a relatively high negative 100 kilovolt potential. The ion source 36 is controlled by an ion source pulser 41.

When supplied with a relatively low level voltage pulse, the ion source 36 causes gas in its vicinity in the tube envelope 33 to become ionized and accelerated toward the target material 35. Upon impinging on the target material 35, the deuterium ions interact thermonuclearly with the tritium nuclei in the target to produce essentially monoenergetic 14 Mev neutrons which are then emitted in a generally spherically symmetrical fashion from the neutron generator tube 33 into the borehole and surrounding earth formations.

A replenisher control circuit 39 is supplied by samples of the neutron generator target current by sampling circuit 38. These samples are utilized to compare with a reference to control the replenisher current and thereby the gas pressure in the envelope of the neutron generator tube 33. Timing circuits 42 which comprise a master timing oscillator operating at a relatively high frequency and an appropriate divider chain, supply 1.25 kilohertz pulses to the ion source pulser 41 and also supply 1.06 clock second pulses to the neutron generator start up control circuit 40. Moreover, timing circuit 42 supplies approximately two megahertz clock pulses to a microprocessor and data storage array 44 and supplies timing pulses to the background circuit 45 and counters 52 and 53. Similarly timing signals are supplied to a pair of gain control circuits 48 and 49.

The interaction of the thermalized neutrons with nuclei or earth formation materials in and about the borehole causes the emission of capture gamma rays which are detected by detectors 46 and 47 (corresponding to the dual spaced detectors 28 and 30 of FIG. 1). In addition to the short and long spaced detectors 47 and 46 of FIG. 2 a third gamma ray detector 59 is also supplied which is located some distance (about 19 ft.) above the thermal neutron decay time measuring portion of the system. This third gamma ray detector 59 which is on continuously is used in order to monitor naturally occurring gamma radiation on a continuous basis in the borehole. Signals from the gamma ray detector 59 are thus also supplied to the microprocessor and data storage array 44 as indicated in FIG. 2.

Gain control circuits 48 and 49 serve to maintain the pulse height output of the detectors 46 and 47 in a calibrated manner with respect to a known amplitude reference pulse. Output signals from the gain control circuits corresponding to gamma rays detected by the detectors 46 and 47 during the time gates as previously described are supplied to discriminator circuits 50 and 51, respectively. The discriminator circuits 50 and 51 serve to prevent low amplitude voltage pulses from the detectors from entering counters 52 and 53. Typically the discriminators are set at about 0.05 to about 0.5 MEV and serve to eliminate noise generated in the photomultiplier tubes associated with the detectors 46 and 47. Discriminators 50 and 51 outputs are supplied to counters 52 and 53 which serve to count individual capture gamma ray events detected by the long spaced and short spaced detectors 46 and 47. Outputs from the counters 52 and 53 are supplied to the microprocessor and data storage circuits 44.

During the background portion of the detection cycle as previously described, the background circuit 45 is supplied with counts from the counters 52 and 53. This circuit also provides a disable pulse to the ion source 41 to prevent pulsing of the neutron generator during the background counting portion of the cycle. The background correction circuit 45 supplies background count information to microprocessor and data storage circuits 44. This background may be stored and averaged for longer periods than capture data since, at low discriminator threshold, most of the background is from gamma ray sodium iodide crystal activation which has a 27 minute half life. However, as will be noted, some of this background gamma ray information is obtained from oxygen activation gamma rays. Good statistical advantage is obtained when the background is corrected for oxygen activation from fluid flow in the borehole as will be discussed subsequently.

The digital count information from the counters 52 and 53 and the background correction circuit 45 is supplied to the microprocessor and data storage circuits 44. These circuits 44 format the data and present it in a serial manner to the telemetry circuit 43 which is used to transfer the digital information from the counters of background correction circuits and from the continuously on gamma ray detector (59 of FIG. 2) to the surface via conductors of the well logging cable 19. At the surface, a telemetry interface unit 54 detects the analog telemetry voltage signals from the logging cable 32 conductors and supplies them to a telemetry processing unit 55 which formats the digital count rate information representing the counting rate from the counters 52 and 53 in the subsurface equipment in terms of the time gating schemes as previously discussed. The digital numbers representative of the count rates in each of the six time gates and in the background counting gate are then supplied to a digital computer 56.

This surface computer 56, as previously discussed with respect to surface electronic equipment 22 of FIG. 1, may be programmed in accordance with the previously mentioned U.S. patents regarding the Thermal Multigate Decay process in order to determine parameters of interest in the well bore and earth formations such as borehole component $\Sigma$ and formation $\Sigma$. Output signals from the computer representing formation parameters of interest, borehole parameters of interest, background counting rates, quality indicators and others to be described subsequently, are supplied from the computer 56 to a film recorder 57 and a magnetic tape recorder 58 for recording as a function of borehole depth.

OXYGEN ACTIVATION

When oxygen is irradiated with neutrons having an energy greater than about 10 MEV the reaction of equation (1) may occur.

$$O^{16} + n \rightarrow N^{16} + \text{Proton} \tag{1}$$

In equation (1) the unstable nitrogen isotope which is produced Beta decays back into oxygen with a 7.35 second half life. The excited state of oxygen 16 thereby produced immediately gives off a prompt 6.13 MEV gamma ray characteristic of this decay. This reaction may be referred to as oxygen activation. This reaction has been used in the prior art for detecting water flow in and behind casing in a cased well borehole. For example, see U.S. Pat. Nos. 4,032,778, 4,035,640 and 4,057,720.

Most of the neutrons emitted by the deuterium tritium reaction accelerator type neutron generator have approximately 14 MEV energy. Any time such a neutron generator is turned on in a borehole and oxygen is present in any form, such as in the water, rock matrix, carbon dioxide, etc., oxygen which is activated does not necessarily get near enough to one of the detectors in order to be sensed by the tool unless there is some relative motion between the well logging tool and the activated oxygen. The spacing between the neutron source and the gamma ray detector 24 of FIG. 1 is approximately 19 feet. Thus, oxygen which is activated in the vicinity of the neutron source 26 is very unlikely to be detected by the continuous gamma ray detector 24 of FIG. 1 unless the instrument or oxygen bearing medium is moving in such a manner that the detector 24 approaches the activated oxygen.

The shorter spaced detectors (28 and 30 of FIG. 1) in the TMD well logging instrument, however, are spaced approximately 1.1 feet and approximately 2 feet from the neutron source. In these detectors, the relatively long half life of the oxygen activation reaction with respect to the capture gamma rays ordinarily associated with the decay of thermal neutron population (the activation half life being approximately 7.35 seconds) would result in an increase in the detected background observed in the background gate when the tool is left stationary in a well borehole. When the tool is moved, the activation (which takes time to build up as well as to decay) is left behind the tool in the well and the background counts quickly decrease. For this reason, activation from fixed materials in the vicinity of the borehole (such as silicon, iron, oxygen and other elements) is not normally seen during the logging operation except for activation which takes place in the toolcase itself or in the detector crystal.

If the well logging instrument detectors of FIG. 1 can be moved across instead of away from activation zones, such as would happen when logging downward in a wellbore with the TMD well logging instrument, the neutron source located at the bottom of the instrument would create the activated oxygen, silicon and other elements, and the detectors would be moved in the direction of the activation.

Another type of observable residual activation from one pass of the TMD well logging instrument to another pass made subsequently can result in observed background increase due to elemental activation. This would not involve oxygen because of the relatively short half life of the oxygen produced by activation. However, the two hour half life of activated iron can result in a residual decay which can be seen in a cased well bore as an increase in the gamma ray log of approximately 5 to 10 API units per log pass on subsequent runs.

Another mechanism which induces observable activation is caused by the flow of oxygen containing fluids past the neutron generator and then past the short spaced detector and long spaced detector, and the gamma ray detector in the well logging instrument. If the flow of such fluid is downward, then no activated oxygen would reach the detectors. Similarly, upward flow will not reach the detectors if the fluid is moving slower than the well logging instrument is moving. For in this case the instrument would be "outrunning" the activation produced radioactive oxygen. If the oxygen rich fluid is moving upward faster than the instrument, there is a complex set of conditions which governs the magnitude of the activation response observed in the detectors.

The magnitude of the response is determined by three factors: (1) the amount of oxygen flowing; (2) the distance of the flow stream from the detector; and (3) the linear flow velocity of the moving oxygen relative to the tool. The intensity of oxygen activation observed (other things being equal) is directly proportional to the amount of oxygen in the flowing fluid stream. Hence, fluid flow up a very small flow channel or small tubing will generate a proportionately smaller response than flow at a similar rate up a large channel or large casing. Also, flow at a given rate and channel size can generate a smaller log response if the flow channel is located farther from the detector. That is to say, a given flow rate and volume flowing up the casing or tubing will cause a bigger activation response than a similar flow volume and rate outside the cement annulus such as by channeling of water from one producing formation to another outside a casing.

Assuming that enough oxygen flows past the neutron source and detectors and is sufficiently close to the detectors to be detected, the activation observed in the detector is still a strong function of the linear flow velocity relative to the tool. For instance, assume a vertical water flow rate in a cased borehole of 30 feet per minute and the well logging instrument moving upward at 20 feet per minute, a typical well logging speed. This would produce a net flow relative to the tool of ten feet per minute. The gamma ray detector is located 19 feet from the neutron source in the tool string. Hence, this flow stream would take approximately two minutes to each the gamma ray detector after passing the neutron source. No flow would be observed in the gamma ray detector since this would comprise approximately 16 half lives of the activated oxygen and it would all have decayed during the two minute interval. In this instance, however, the two TMD well logging instrument detectors, the short spaced and long spaced, will observe the ten foot per minute relative flow rate since the activated oxygen would take only a few seconds to reach them after passing the neutron source.

At the other end of the flow rate spectrum, however, if very high flow rates are encountered, hundreds of feet per minute or more for example, the oxygen activation produced will not have decayed prior to reaching the 19 foot spaced gamma ray detector. However, in such cases the flow past the neutron source would so fast that almost no oxygen would be activated in the first place. Again, this situation would result in no detected activation count rate in any of the detectors. The fluid flow can therefore be too slow to be seen and also too fast to be seen. There would appear to be for a given source to detect the spacing an optimal flow rate ($V_{opt}$) which will produce maximum activation. This optimum flow rate is given approximately by equation (2):

$$V_{opt} = (41.58 \, L/T) \quad (2)$$

In equation (2), $V_{opt}$ is in feet per minute, L is the source to detector spacing in feet and T is the activity half life in seconds. For oxygen flow (i.e., $T = 7.35$) Equation (2) reduces to the form of equation (3):

$$V_{opt} = 5.657 \, L \quad (3)$$

Equation (3) produces the results that in the TMD well logging instrument short spaced detector, spaced at 1.1 feet from the source, a flow rate relative to the instrument of about 6 feet per minute will produce the optimum response from oxygen activation. Similarly, in the TMD long spaced detector, (having a source to detector spacing of two feet) a flow rate of about 11 feet per minute would produce an optimum response at the detector. Finally, in the gamma ray detector having a source to detector spacing of 19 feet, a flow rate of approximately 107 feet per minute would produce an optimum response in the detector. For any fluid flow rates greater or less than these optimum values, the observed count rates due to oxygen activation in the detectors would decrease rather than increase. The minimum relative flow rate detectable by the instrument is roughly one to four feet per minute relative to the tool, depending on the volume of oxygen in the flow channel and the amount of other background in the two TMD detectors.

Assuming that a large enough flow channel near the well logging instrument exists, FIGS. 4 and 5 may be used to convert the measured fluid flow rates at the surface into linear flow velocities past the TMD well logging instrument in the borehole for different casing and tubing sizes. The charts of FIGS. 4 and 5 give output fluid velocity relative to a tool assumed to be moving upward at approximately 20 feet per minute. Negative velocities in the charts of FIGS. 4 and 5 means that the water flow is upward slower than the instrument is moving. Also marked on FIGS. 4 and 5 is a dashed vertical line at approximately three feet per minute, which, as discussed above, is roughly the minimum flow rate relative to the tool which can be detected. Flow velocities for maximum counting rates in each detector are also shown. For well logging instruments moving at other than 20 feet per minute logging speed, relative fluid velocity is obtained from these figures will be in error and must be corrected. The formula of Equation (4) may be used for this.

$$\text{FLUID VELOCITY (REL. TO TOOL)}_{TRUE} = \quad (4)$$

$$\text{CHART VALUE} + 20 - \text{LOG SPEED}$$

Often, it is desirable to log a well with the well in a producing configuration such as shown in FIG. 1 to minimize invasion effects. Logging under producing conditions can also permit the detection of water flow into the casing opposite open perforations. Hence, it can identify water productive zones and may also be used to see any upward flow outside the casing indicating channeling in the cement or formations exterior to the casing. If FIGS. 4 and 5 for example should indicate that for the production rate at the surface, no flow rate would be observed, then it may be possible to reduce logging speed below 20 feet per minute and thereby generate detectable fluid flow. The lower the logging speed, the lower the possible flow velocities which could be detected. The minimum flow rate observable would generally be in the range of one to four feet per minute faster than the logging speed. Stationary measurements would see flow at one foot per minute or less were it not for the fact that this activation would be superimposed on the activation from fixed oxygen, silicon, iron, etc., which also builds up with the tool stationary. Logging the perforated zone at several different speeds in repeat passes can identify the point in the well of minimum flow rate for each logging speed. This minimum velocity profile can then be directly converted into a conventional production logging display of flow rate versus depth.

Oxygen activation counts appear in the TMD logging curves in the background channels for the short spaced and long spaced detectors, and possibly on the natural gamma ray curve produced by the gamma ray detector. The place at which these activation counts occur on the log, however, do not mark the point of water entry into the borehole. Oxygen activation will not take place until the neutron generator passes the point of water entry. At that instant, these detectors are 1.1 feet, 2.0 feet, and 19 feet uphole from the neutron generator. Even in the limit of infinitely fast water flow, therefore, the oxygen counts would appear uphole on each log curve by these depths. In addition, depending on the water flow rate and the logging speed, each detector will have moved even further uphole by the time the activated flow arrives adjacent that detector. FIGS. 6 and 7 indicate the uphole displacement for a log made at 20 feet per minute between the actual point of entry of water into the hole and the appearance of the flow on the long spaced background and gamma ray curves as a function of relative water flow rate. A general formula for this displacement is given by equation (5) below:

$$\text{LOG DISPLACEMENT FROM ENTRY} = \quad (5)$$

$$(SD \text{ SPACING}) + \left( \frac{(SD)}{\text{REL. FLOW RATE}} \times \text{LOG SPEED} \right),$$

where SD=Source to detector spacing

The uphole displacement in the short spaced background counting rate due to oxygen activation is approximately ½ the displacement observed in the long spaced detector background curve. With this fact, it can be determined that if increases in background in the two TMD instrument detectors can be correlated to the same source of activation, then the source of activation is a slightly greater distance below the point of activity on the short spaced detector background curve than the log separation between the two detectors. For example, if there is a four foot separation between an activation increase in the two background curves from the short spaced and long spaced TMD instrument detectors, the true source of activity is approximately five feet below the point of activity on the short space background curve.

Once a flow rate is determined using FIGS. 4 and 5, it is possible using FIG. 6 and the observed activation level on the TMD long spaced detector background to determine the effect on the TMD gamma ray log due to this oxygen activation. The TMD long spaced detector and the TMD gamma ray detector are physically identical and have similar bias levels. Hence, knowing the logging speed of the TMD instrument, it is possible to calculate the API oxygen activity on the gamma log from the API oxygen activity in the long space background curve. The long space background curve on the TMD quality log is the actual observed count rate in counts per second in the long space detector. Since the background gate is only on for 55 milliseconds during each 1.06 second operating cycle, however, this number must thus be multiplied by 19 to convert to calibrate per second for comparison with the gamma ray detector which of course is on continuously. However, not all background counts in the long spaced detector are from oxygen activation. Hence, the background must also be corrected for this effect. A nearby zone in which no water flow is present can be used to determine the true background calibrate under non flowing conditions. Then, Equation (6) may be used to determine the oxygen activation long spaced detector count rate in terms of counts per second:

$$\text{OXY. ACTIV. } LSD \text{ COUNT RATE } = \quad (6)$$

$$(LS - BKG)_{FLOW} - (LS - BKG)_{NO\ FLOW} \times 19.0$$

Both the long spaced TMD instrument detector and the gamma ray detector have a gamma log efficiency of approximately 1.0 count per second equal 1.0 API unit. Therefore, Equation (7) predicts the API count rate in the long spaced TMD detector:

$$API(LSD) = \quad (7)$$

$$(LS - BKD)_{FLOW} - (LS - BKG)_{NO\ FLOW}19.0 \times 1.0$$

The fraction $\alpha$ of this count rate which will remain when the fluid moves to the gamma ray detector is a function of the flow rate relative to the well logging instrument. FIG. 8 may be used to determine $\alpha$ as a function of this flow rate as output from FIGS. 4 or 5. Hence the API activity in the gamma ray detector due to oxygen activation flow is given approximately by Equation (8):

$$API_{OXY.ACTIV.}(\gamma) = \alpha API\ (LSD) \quad (8)$$

The approximate API value on the gamma ray log given by equation (8) should be subtracted from the observed API count rate in the gamma ray detector to get a more meaningful formation natural gamma ray response. Note from FIG. 6 that flow rates less than about 20 feet per minute relative to the tool will cause no effect on the gamma ray log.

BOREHOLE FLOW CONFIGURATIONS HAVING ANOMALOUS RESULTS

Assume that the TMD well logging instrument has been used to log a flowing well producing both water and oil in significant quantity. Assume that the well is perforated over two long intervals. No oxygen activation water flow is seen in any background curves until the top of the lower set of perforations at which point the background count rate in both the long and short spaced detectors increase. It might be concluded from this that a large volume of water is entering the well just below that point. Such an assumption could be correct or could be incorrect.

Oxygen activation will be observed whenever: (1) water is in the flow stream; and (2) the total flow rate of the produced fluid is adequate as calculated using FIGS. 4 or 5. In the above example, hypothesize that water is entering the bottom of the lower perforations but not in sufficient volume to result in flow up the borehole fast enough to be observed in the background count rate of the short spaced and long spaced detectors of the TMD instrument. Then hypothesize that oil enters the top of the lower set of perforations. This would increase the total mixed oil and water flow rate such that the flow is fast enough to be observed. This would produce the same response on the long and short spaced background curves, mainly an increase above no flow levels in the background, near where the oil entered the borehole.

Another possible solution of this configuration, however, would be that water is entering the borehole along the whole length of the perforations including the top of the perforations but that the flow only reached an observable rate near the top of the perforations. The only thing which could be said for certain without relogging the well using a different logging speed is that water is entering the borehole somewhere in the lower perforated interval.

A fluid sampler such as shown at 30a of FIG. 1 can be used to resolve such anomalous flow conditions however. The use of a conventional spinner type flow meter or a fluid sample taker can also make an excellent complement to the TMD well logging instrument, the flow meter determining the flow rate versus depth but not the fluid type and the TMD well logging instrument determining from oxygen activation whether water or oil is produced.

Similarly, the fluid sampler 30a of FIG. 1 can capture a sample of a fluid from a particular depth. The sample can be brought to the surface for application of known types of chemical or physical separation of oil from water in the collected fluid and the precise type of fluid flow at a particular depth thereby determined. The fluid sampler 30a of FIG. 1 can for example contain several small 30–50 cc chambers with an electrically operated one way valve which is activated from the surface. The macroscopic capture cross-section of the borehole as measured by the TMD tool can thus be a supplement used with an actual fluid sample to identify water or oil productive perforations as well as to determine oil, water and gas cuts in produced well fluids. By bringing the sample to the surface, if the precise mixture of fluids at a given depth is known, then ambiguous flow situations such as that described previously can be resolved. In this manner, the fluid sampler can provide a valuable supplement to the TMD well logging instrument.

Assume that TMD well logging instrument continues moving past the upper set of perforations in the configuration previously described. Unless the flow rate at the bottom of the upper perforations set is known, then background increases and decreases in the long and short spaced detectors can occur from either water of hydro carbon entering the flow stream in the casing. For water entry into an oil plus water flow stream, if the flow rate is increased past the optimum velocity, effects which tend to offset occur. The added water, and hence the higher oxygen content in the stream, tends to increase the observed count rate. The faster than optimum flow rate tends to decrease the count rate. For oil entry, if the added fluid flow tends to optimize the fluid velocity the oxygen count rate can actually increase despite the higher oil fraction in the flow stream. However, if the added flow pushes the velocity past the optimum, a significant decrease in the oxygen background appearing in the long and short spaced detectors can occur.

The fluid flow rate at the top of the upper set of perforations is known from the surface flow data. Hence, interpretation near the top of the upper set of perforations is less ambiguous. However, as in the lower perforations if a flow meter is available or a fluid sampler such as 30a of FIG. 1, then ambiguities throughout the upper perforation set may be resolved.

In some instances, however, it may be possible to resolve ambiguous flow situations using the TMD well logging instrument without the aid of a flow meter of sample taker by varying the logging speed on subsequent passes. If water flow activation is observed at one point in a well, then relogging at faster speeds until the activation disappears will define the flow velocity at that point (i.e., when flow disappears the tool is moving at approximately the same velocity as the flow stream). Conversely, if activation related flow is not observed in the zone of interest, then slower logging speeds can be used across the zone to define water flow velocity below the critical detectable relative velocity (unless the entire flow is from oil or gas containing no oxygen).

It could also be possible to aid in the interpretation of fluid flow by using other log curves produced by the TMD logging instrument. For example, the macroscopic capture cross-section $\Sigma_{bh}$ for the borehole in the short spaced detector will decrease with increasing oil or gas saturation in the borehole fluid. The ratio of counts in the near to far detectors in the time gates 3 through 6 count rate curves and the ratio of borehole to formation counts could be used to identify changes in the borehole hydrogen index and hence in the salinity of the borehole fluid. The macroscopic capture cross section of the formation $\Sigma_{FM}$ itself could be used to indicate residual saturation as one would not expect oil entry in a zone with macroscopic formation capture cross-section $\Sigma_{FM}$ to high enough to indicate a residual saturation.

Oxygen activation from borehole flow will sometimes be detected with the well shut in, especially if the shut in takes places just prior to logging. This is only a temporary effect, usually lasting approximately 30 minutes or less which can be caused by fluid surge up the borehole to fill the casing or tubing against air pressure trapped therein. Therefore, if it is desired to log with the well shut in and also with the well flowing, the shut in log should be run first with the well shut in for a good while prior to the logging run in order to stabilize out this nonequilibrium condition under no-flow conditions.

The foregoing discussions and descriptions may make other alternative embodiments or arrangements according to the concepts of the present invention apparent to those skilled in the art. It is therefore the aim in the appended claims to cover all such changes and modifications as far within the true spirit and scope of the invention.

I claim:

1. A method for identifying the point of entry of water cut production in a producing well utilizing a pulsed neutron well logging instrument and a fluid sample taker sized and adapted for passage through a production tubing string into a perforated producing interval of a cased well borehole, comprising the steps of:
   moving a pulsed neutron well logging sonde along a longitudinal axis of a well borehole over a producing interval of a perforated cased borehole at a logging speed sufficiently slow to enable significant oxygen activation of fluid in the borehole;
   irradiating the fluids in the borehole with pulses of fast neutrons having sufficient energy to produce oxygen activation of the borehole region if oxygen is present therein;
   detecting gamma radiation induced in the borehole fluid by said irradiating step at least at two spaced distances from the position at which said irradiating step occurs and producing at least two count rate signals representative thereof;
   combining said count rate signals and a signal representative of the logging speed of said sonde to derive a signal representative of the entry location and the flow rate of oxygen activated fluid past said at least two spaced detectors; and
   taking at least one borehole fluid sample in the interval between said two spaced distances and determining the water cut in said sample, thereby resolving any ambiguity in the total flow rate in said interval due to entry of hydrocarbon or water cut along said interval.

2. The method of claim 1 wherein the steps are repeated at different depths across the producing interval with borehole fluid samples taken at plural depths across said interval.

3. The method of claim 2 wherein said well logging instrument simultaneously determines a borehole component and a formation component of macroscopic thermal neutron capture cross section and record signals representative thereof as a function of depth across the producing interval.

4. The method of claim 3 wherein the irradiating steps are performed using a deuterium-tritium accelerator type neutron source which produces approximately monoenergetic 14 MEV neutrons.

5. The method of claim 1 wherein the additional step is performed of measuring the total fluid volume flow speed in said interval with a spinner flowmeter.

6. A method for identifying at least qualitatively the point of entry of water cut production in a producing well utilizing a pulsed neutron well logging instrument and a fluid sample taker sized and adapted for passage through a production tubing string into a perforated producing interval of a cored well borehole, comprising the steps of:
(a) moving a pulsed neutron well logging sonde at a first logging speed along a longitudinal axis of a well borehole over a producing interval of a perforated borehole, said first speed being sufficiently slow to enable oxygen activation of fluid in the borehole;
(b) irradiating the fluids in the borehole with pulses of fast neutrons having sufficient energy to cause oxygen activation of the borehole fluids if oxygen is present therein;
(c) detecting gamma radiation induced in the borehole fluid by said irradiating step at least at two spaced distances from the position at which said irradiating step occurs and producing at least two count rate signals representative thereof;
(d) combining said count rate signals and a signal representative of the logging speed to derive a signal representative of the flow rate of oxygen activated fluid past said at least two spaced distances;
(e) repeating steps (a), (b), (c) and (d) at different logging speeds, observing where the oxygen activation induced gamma radiation disappears, thereby defining a fluid flow velocity across said at least two spaced distances.

7. The method of claim 6 and further including the step of taking at least one borehole fluid sample in the interval between said two spaced distances and determining the water cut in said sample, thereby resolving any ambiguity in the total flow rate in said interval due to entry of hydrocarbon or water cut along said interval.

8. The method of claim 7 wherein all of the steps are performed at different depths across the producing interval with borehole fluid samples taken at plural depths across said interval.

9. The method of claim 8 wherein said well logging instrument simultaneously determines a borehole component and a formation component of macroscopic thermal neutron capture cross section and records signals representative thereof on a function of borehole depth across the producing interval.

10. The method of claim 9 wherein the irradiating steps are performed using a deuterium-tritium accelerator type neutron source which produces approximately monoenergetic 14 MEV neutrons.

* * * * *